Sept. 25, 1956 A. HUET 2,763,917
FORMING BULGE ON METALLIC TUBE FOR CREATING
TUBULAR FITTING OR LIKE ELEMENT
Filed June 25, 1951 3 Sheets-Sheet 2

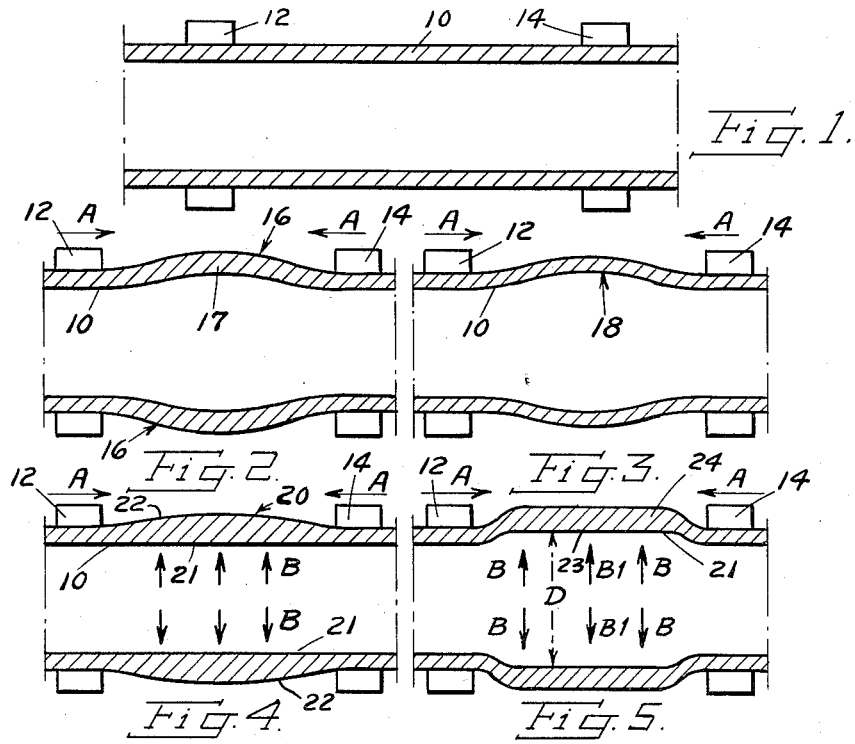

ANDRE HUET
INVENTOR.

BY *James J. Whalen*
ATTORNEY

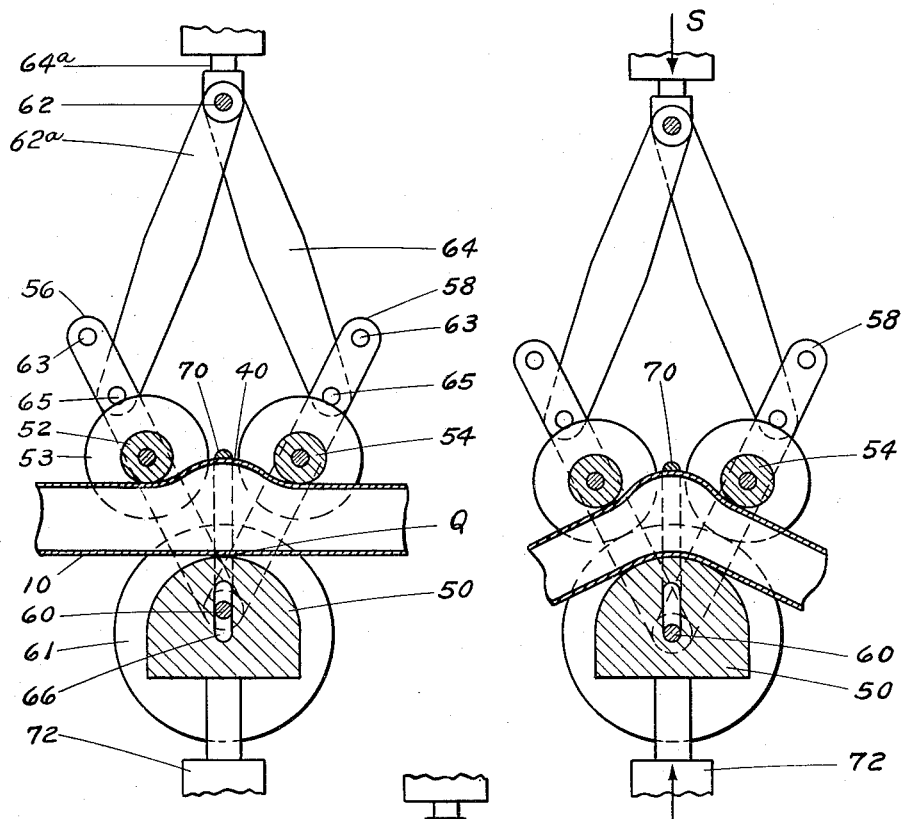
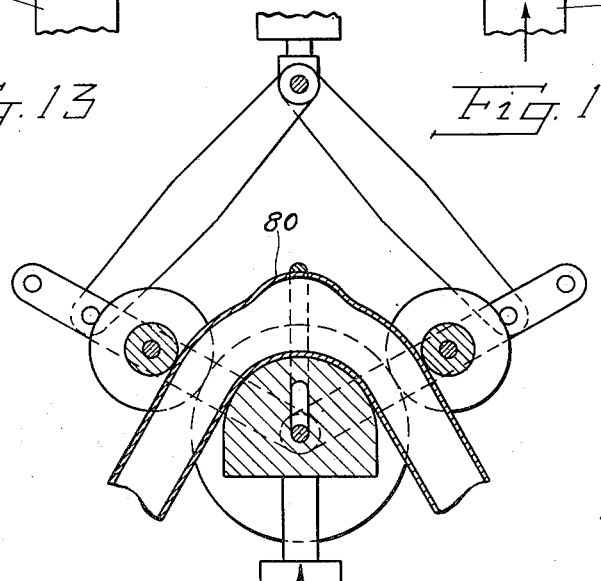

United States Patent Office 2,763,917
Patented Sept. 25, 1956

2,763,917

FORMING BULGE ON METALLIC TUBE FOR CREATING TUBULAR FITTING OR LIKE ELEMENT

André Huet, Paris, France, assignor to Combustion Engineering, Inc., New York, N. Y., a corporation of Delaware Application June 25, 1951, Serial No. 233,358

6 Claims. (Cl. 29—157.6)

The present invention relates to working or manipulating metallic tubes to form fittings such as unions like T's, return bends or various other forms, or alternatively to simply alter the section or wall thickness of a tube.

This invention contemplates a process by which it is possible to increase or to diminish, at any desired point in the length of a tube, the thickness of its wall, and/or the diameter of the internal section of this tube; all without the insertion within the tube of sand or other filler or the use inside the tube of a punch or of an inside die. The process which is the subject of the invention permits an enlargement or a diminution of the internal section of a tube, with or without accompanying increased thickness of the wall at any point whatsoever of the length of said tube, even though the tube might have bends or convolutions which at other parts would normally prevent, or make very difficult, the passage of inside punches or a filler.

Fundamentally the process of the present invention, creates, by any suitable method, a heat gradient in the thickness of the wall of the tube at the place which is to be treated, and the portions of the tube contiguous to this part are subjected to a compressive force which tends to upset them.

To effect the heat gradient mentioned any heating means may be used such, for example, as a resistance heating mechanism provided with clamps or jaws which grip the tube on both sides of the region which is to be altered. These jaws are mobile with respect to one another so as to be able to be brought together for exerting the sought for compression. Moreover, either the external wall of the tube in the region being treated may be cooled as by means of a current of cold air, or the inside wall of said tube cooled, for example by injection of cold air inside of the tube, possibly accompanied by atomized water. In this way there is created between the different concentric layers of metal into which the thickness of the wall of the tube can be divided, a gradient of heat which is a function of the conductivity of the metal and of the coefficient of external heat transmission.

If the length of the tube which is to be altered is heated homogeneously to a temperature at which the metal appears dark red and the tube is compressed by moving toward each other the two clamps or other parts that are contiguous on both sides to the length heated, the tube swells up in the form of a "gendarme's hat"; and a bulge is created perfectly symmetrically. Increase of thickness of the wall of the tube results if the temperature is low enough, that is to say, that an increased thickness of wall and an increase of the internal section of the tube is produced.

When heated at a higher temperature, for example, at which the metal appears light red, a symmetrical bulge is obtained but without increase of the thickness of the tube; that is to say, only an increase of the bore of the tube is produced at the bulge.

If the tube is heated to dark red, and while continuing to heat the inside wall of the tube is simultaneously cooled by means of a jet of air (which can if necessary contain atomized water) and directed inside the tube to the desired spot, an increase of thickness of the tube results but with a much less increase of the bore of the tube than in the first case (or there may even be no increase of section) because of the fact that the internal fibres of the tube, which are colder and less malleable, resist the compression more than the periphery.

More generally, if the cooling, instead of being homogeneous over the entire length treated is concentrated at the center of the heated part, the bulging effect is counteracted and there is produced an enlargement of the internal section of the tube in cylindrical shape which extends over the entire surface treated.

Likewise, in a general way, if the heating is carried from dark red to light red, the tendency toward increase of the thickness of the wall of the tube in the portion treated is counteracted, and at a temperature in the vicinity of light red, one can manage to maintain the same thickness of wall for the tube over the entire portion treated.

It may happen that the cooling provided for in the foregoing paragraphs is not distributed, and that the heating itself, as well as the thickness of the tube are not sufficiently homogeneous, so that the exterior contour of the treated portion of the tube may have irregularities. In such case, the present invention includes placing outside of the portion of the tube to be treated, a die or mold made up, for example, of two semi-cylinders, the internal calibration of which corresponds to the external calibration which one seeks to produce in the treated portion of the tube. This die can be spaced from the tube by an insulating layer of asbestos, or it can be made of materials which do not adhere to the hot tube, for example, of copper. There may also be provided a device for cooling the die, by circulation of water, for example, which permits of assuring continuous service. Finally, the axis of the die can be eccentric with respect to the axis of the tube treated when it is desired to obtain in the altered portion of the tube a decentering of the increased thickness, or a decentering of the bore of the tube with respect to the section of the non-treated tube.

The invention further contemplates the utilization of the symmetrical bulge produced by applying compressive forces for the formation of various types of tube forms, such as T unions, return bends, similar forms and other fittings. In general this involves, according to the present invention, the altering of a tube section to create a bulge, without notably increasing the thickness of the wall of the tube. When the bulge is made eccentric to the bore of the tube, the structure is particularly suited to formation of T or Y unions. By a tube with eccentric bulge is meant a tube part of which is swollen in the shape of a bulb, the axis of this eccentric bulb not coinciding with that of the tube, that is, the bulb affects only one sector of the cylindrical wall of the tube.

According to this aspect of the invention a centered bulb is first produced, for example, by pressing the tube back onto itself, after this by a suitable stamping, for example, the eccentricity of this bulb is produced by restoring a sector of the bulged tube to the cylindrical form of the original tube section. During this operation one part of the material of the tube passes from one sector of the bulge in the tube to the opposite sector without notably increasing the thickness of the tube on the opposite bulged sector. It is then possible to utilize this displacement of material to obtain various tubular forms or fillings. In particular, the eccentric bulge may be opened so as to permit joining another tube to the straight tube section in order to obtain a T tube. The inner diameter of the tube branch which is joined on may be greater than the inner diameter of the original tube, because the bulge may be opened wider than the non-modified wall of the cylindrical tube could have been. On the other hand, the eccentric bulge can also be pressed back so fully that the end result is a cylindrical tube having an eccentric increased wall thickness, that is to say, an increased thickness which affects only one sector of said tube. A tube with eccentric bulge may, according to the invention, also be bent into a return bend. If the bulge at the elbow is opened a bifurcate may be formed by joining on another tube directed in a direction the reverse of that of the arms of the elbow bend; or, if the bulge is pressed back fully an elbow bend would have a thickness of wall in the outer region greater than the normal thickness of the tube, and even if desired greater than the thickness of the wall in the inner region of the elbow bend.

The invention involves not only the method, but also certain apparatus. The order of the operations which have been described above is not mandatory. In particular, the pressing back of the eccentric bulge may take place before the bending of the tube to elbow or return bend form. The bulge could even be produced on a tube already previously bent with a view to effecting on the bend, either a joint by opening the bulge, or an increased thickness of the wall in the outer region of the bend.

Figure 1 is a longitudinal section of a portion of straight tube to be treated, shown supported in two relatively movable clamps or jaws associated with a resistance heating mechanism.

Figures 2 to 5 show, in longitudinal section, various forms which the tube of Figure 1 can be given, when it is subjected to the operations provided for by the invention.

Figs. 13, 14 and 15 show diagrammatically in three positions the symmetrical bending device for the two arms of a tube.

Figures 6, 7, 8:
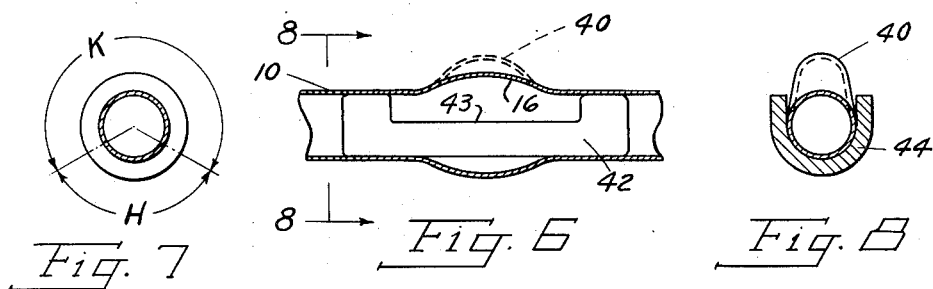
Figure 6 shows a longitudinal section and Figure 7 a transverse section of a tube having a centered bulge.
Figure 8 is a section along the line 8—8 of Fig. 6 showing the stamping according to the invention for obtaining an eccentric bulge.

As may be seen in Fig. 1, the portion of the tube 10 which it is desired to alter according to the invention is embraced between the two relatively movable clamping rings or jaws 12, 14 which, for example, are part of a resistance heating mechanism. The intermediate part of the tube is brought to a fixed degree of heating by the passage of electric current through the tube 10 from ring 12 to ring 14. Obviously another method of heating the portion of the tube in question may be employed but heating by electrical resistance is convenient.

If the tube is heated to a dark red temperature and the two rings 12, 14 moved toward each other in the direction of arrows A of Fig. 2, a tube is obtained with its wall bulged 16, perfectly symmetrically with increased thickness of the wall of the tube a maximum at 17 in the plane of symmetry of the figure.

If the tube is heated to cherry red, the profile shown in Fig. 3 results, the bulge 18 has no increased thickness, the wall of the tube remaining constant in thickness over the entire portion treated.

If while heating the tube at the dark red temperature the inside wall 21 of the tube is cooled by injection of air in the direction of the arrows B (Fig. 4), the cooling which results therefrom for the inside wall of the tube, and which counteracts the compression of the inner wall, causes only the outer wall 22 of the tube to be bulged, so that one finally obtains a section 20 such as that shown in Fig. 4, with an increased thickness of the wall of the tube, but little or no increase of the inside passage section or bore of the tube.

If instead of cooling the inside wall of the tube homogeneously the center 23 of the treated portion of the tube is cooled more (as shown in Fig. 5 by the heavier arrow $B^1$) in the central portion 23 of the tube, the "gendarme's hat" effect which tends to be produced during the compression is counteracted and an increase of the bore D of the tube results in combination with an increase of the increased thickness of the wall 24 of the tube. In this case, as may be seen, the increase of the bore D of the tube is extended cylindrically to the entire portion treated of the tube.

To create a tubular fitting or part, such as a T or Y union or an elbow or return bend, a bulge is formed between selected points of a tube length in accordance with any of the methods described above, in conjunction with Figures 1 to 5. The bulge 46 thus obtained is heated on its entire contour, or on only one part and the metal of this bulge is pressed back on a certain sector H Fig. 7 so as to obtain an eccentric bulb 40 as shown by the broken lines in Fig. 6 and in section in Fig. 8. This operation may be carried out in various ways; for example, after the optional introduction inside of the tube 10 of a punch or mandril 42 preferably hollowed out at 43 as shown in Fig. 6 the tube is put in a die 44 (Fig. 8) having a groove or recess in the shape of a semi-cylindrical channel. The die 44 may be separated by a layer of asbestos from the wall of the tube, or the die may be of suitable metal and preheated. Instead of a stamping operation, the sector H of the tube may be brought back to cylindrical or semi-cylindrical contour by a rolling operation. The portion H of the tube is restored to a cylindrical profile, without the thickness of the tube in this area being increased whereas the material of the bulge 16 is pressed back accentuating asymmetrically the swelling of the bulb, as shown at 40 in Figures 6 and 8 and there again, without there being any notable increase in the wall thickness of the tube in the bulged region. Thus, there is obtained a tube with eccentric bulb 40 such as is shown in longitudinal section in Fig. 9.

Figure 10:
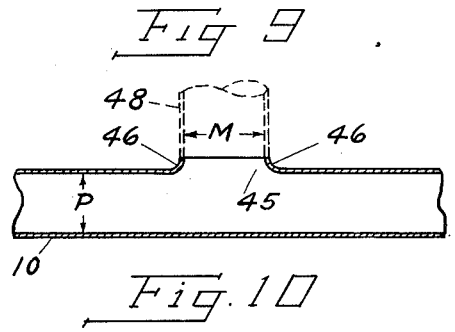
Figure 10 is similar to Fig. 9 after opening of the bulge to make a connection.

Owing to the displacement of material of the sector H of the tube toward the opposite sector K, it is possible to make various forms of tubular elements which up to the present time have been produced only with difficulty. For example, by opening the eccentric bulge 40 and raising up the edges of the opening 45, one may make, as shown in Fig. 10, a neck 46 which makes it possible to weld a portion 48 of tube to tube 10 in order to make a T union. The diameter M of the opening 45 of the neck 46 may be greater than the bore P of the straight tube length 10 since there is an excess of material available at this spot. Such a result could not be secured if one simply raised a neck on the wall of a cylindrical tube which had not been centrally bulged to provide the requisite metal for the greater diameter of the annulus forming the neck 46.

The eccentric bulge 40 on the other hand may be fully flattened out to restore a cylindrical profile to the tube and the material of the bulb 40 creates an increased thickness on a certain sector of the cylindrical tube.

Figure 9:
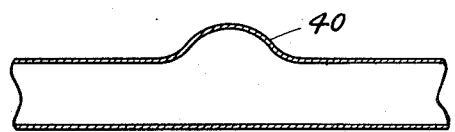
Figure 9 is a longitudinal section of the tube with eccentric bulge.

The tube with eccentric bulge such as shown in Fig. 9 may be bent, preferably with the aid of the process and the devices illustrated in Figures 13 to 15. According to this process, instead of effecting the bending in conventional manner by winding or drawing the tube about a bending roller, the two parts of the tube contiguous to both sides of the bulge are applied symmetrically to a shaping roller, preferably after heating the tube in the region Q which corresponds to the tube part that will become the crotch of the bend. Owing to symmetry in the bending movement, and despite the increase of the moment of inertia of the tube in the bulged region, one can cause, without flattening out and without formation of folds in the inner region, the applying of the tube onto the shaping roller.

The apparatus has, for example, a shaping roller 50 which has a channel of desired shape into which the tube will be pressed by two bending rollers 52, 54 placed symmetrically on both sides of the bulge 40 at the beginning of the operation.

The axes of the rollers 52, 54 are mounted on double links 56, 58 joined on the one hand onto the axis 60 of the roller 50 and on the other hand onto links 62a, 64 which in turn are attached at 62 at the end of the rod of a piston 64a which can be shifted in the direction of arrow S in order to exert the bending stress. The shaping roller 90 whose upper half contributes to giving the bend its shape, has a slot 66 into which the axis 60 passes to slide in the direction of the axis of symmetry of the device. This arrangement makes it possible in the first place, to place the bulged tube 10 between the base of the roller 50 and the base of the bending rollers 52, 54 as shown in Fig. 15. When the tube 10 (which is preferably heated beforehand on the entire region Q which corresponds to the crotch of the bend so as to create a difference of temperature between this region and the outer region) has been placed between the rollers, as shown in Fig. 15, the bulge 40 may be fastened by any suitable means, such as a brace 70 forming a stop or a die fastened either to the shaping roller 50 or to the bed of the machine, so that the bulge 40 is immobilized in the plane of symmetry of the apparatus. In Fig. 15 it will be noted that the roller 50 has not yet attained its final position, in which it is centered on its axis 60.

Figure 11:
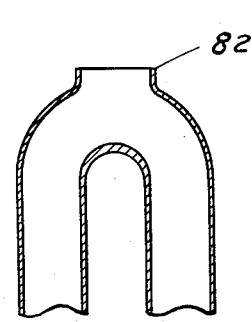
Figure 11 is a longitudinal section of an elbow bend with arms brought nearly together with opened bulge for making a connection.

During the initial part of the operation, the roller 50 is at first forced by means of a piston or jack 72, or by any other device, so as to be centered on its axis 60 and to cause an initial curvature at the top of the bend as shown in Fig. 11. At this moment, the distance which separates the base of the channel of the roller 50 and the bases of the channels of the rollers 52, 54 is equal to the outer diameter of the tube 10. The bending rollers 52, 54 have cheeks or flanges 53 which come to be applied as shown in Fig. 11 against the cheeks 61 of the shaping roller 50 so as to completely confine the arms of the tube 10 between the rollers.

When the position of Fig. 11 is attained, the piston 64 displaces the bending rollers 52, 54 symmetrically to apply the two arms of the tube contiguous to bulge 40 in the base of the mouth of the guide roller 50, thus assuring the bending of the tube on an internal radius equal to the radius of the mouth of roller 50. It will be noted that the double links 56, 58 have a series of holes 63 which make it possible to vary the position of the articulation axes 65 with the links 62, 64 and consequently to control the stress being exerted on the tube during bending.

Finally, one obtains an elbow or return bend bent the required amount, for example 180 degrees, and having a bulge 80 in the outer region of the elbow or bend. Such an elbow bend can then be, according to the disclosure of prior patents of the applicant, subjected to a stress which brings its arms together, so as to have a radius of inner curvature as reduced as is desired.

Figure 12:
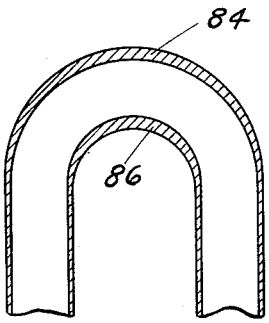
Figure 12 is a longitudinal section of a bend with outer wall re-inforced by flattening out the bulb.

As in Fig. 10, the bulge 80 may be open in order to provide a connection neck 82 (Fig. 11) and thus make it possible to obtain a bifurcated tube or Y shape. Again, the bulge 80 may be pressed back so as to create in the outer region of the bend an increased thickness such as 84, Fig. 12. This thickness may even be greater than the increased thickness 86 of the crotch of the elbow bend which results from the winding of the tube onto the guide roller 50. As has been stated, the order of the various operations is not imperative. One could, for example, effect bending after a preliminary flattening out of the bulge which would have the effect of reinforcing the thickness of the tube in the region which will become the outer region of the elbow bend. One could also effect the bending operation after opening the bulge as in Fig. 10. Finally, the bending apparatus is usable to the bend of an ordinary straight tube, and the formation of a neck or of an increased thickness on the elbow bend could be applied with formation of a bulge, at first centered, then eccentric, on the tube already bent in the form of an elbow.

What I claim is:

1. The method of fabricating a tubular element comprising; heating the entire circumference of an empty metallic tube over a determined portion of its length located between the ends thereof; grasping the tube at spaced points between the ends thereof and applying without external support between said points from said points compressive forces acting in directions toward each other to shorten the length of the empty tube between said points while increasing the tube diameter to form a blister-like bulge therein extending completely around the circumference of the tube at the heated portion; restoring a determined sector of the bulged portion of the tube to cylindrical form to create an eccentric bulge while working metal from said sector into the remainder of the bulged portion of the tube to enlarge the eccentric portion of said blister; and forming the workpiece into a 180° return bend by bending the empty tubular workpiece intermediate its ends on an axis passing symmetrically through said eccentric portion and with the bending forces applied in a direction away from the latter so that the eccentric bulge portion is stretched to form the outer elbow region of the bend.

2. The method of fabricating a tubular element comprising; heating the entire circumference of an empty metallic tube over a determined portion of its length located between the ends thereof; grasping the empty tube at spaced points between its ends and without external support between said points applying from said points on the empty tube compressive forces acting in directions toward each other to shorten the length of the empty tube between said points while increasing the tube diameter to form a symmetrical blister-like bulge therein extending completely around the circumference of the tube at the heated portion; and restoring a determined sector of the bulged portion of the tube to cylindrical form to create an eccentric bulge while working metal from said sector into said eccentric bulge.

3. The method of fabricating a tubular element comprising; heating the entire circumference of an empty metallic tube over a determined portion of its length located between the ends thereof; grasping the empty tube at spaced points between its ends and without external support between said points applying from said points compressive forces acting in directions toward each other to shorten the length of the empty tube between said points while increasing the tube diameter to form a symmetrical blister-like bulge therein extending completely around the circumference of the tube at the heated portion; and restoring a determined sector of the bulged portion of the tube to cylindrical form to create an eccentric bulge while working metal from said sector into the wall portion from which the eccentric bulge protrudes to increase the thickness of said wall portion.

4. The method of fabricating a tubular element comprising; heating the entire circumference of an empty metallic tube over a determined portion of its length located between the ends thereof; grasping the empty tube at spaced points between the ends thereof and without external support between said points applying from said points compressive forces acting in directions toward each other to shorten the length of the empty tube between said points while increasing the tube diameter to form a symmetrical blister-like bulge therein extending completely around the circumference of the tube at the heated portion; and restoring a determined sector of the bulged portion of the tube to cylindrical form to create an eccentric bulge while working metal from said sector to enlarge the said bulge asymetrically.

5. The method of fabricating a tubular element as recited in claim 3 including the additional step of reducing the eccentrically bulged section of the tube to restore the tube to fully cylindrical form while working the metal of the tube in a manner to maintain the metal making up the eccentric bulge on the side of the tube from which the eccentric bulge extended and thereby increase the wall section of the tube on said side.

6. The method of fabricating a tubular element as recited in claim 5 including the further step of bending the empty tube to form a bend therein with the tube positioned during the bending operation so that the portion of increased wall thickness is located in a position to form the outer arc of the bend.

References Cited in the file of this patent

UNITED STATES PATENTS

| Number | Name | Date |
|---|---|---|
| 343,962 | Mack | June 15, 1886 |
| 641,535 | McKibben | Jan. 16, 1900 |
| 691,454 | Dies | Jan. 21, 1902 |
| 1,046,138 | Babbitt | Dec. 3, 1912 |
| 1,276,013 | Beach | Aug. 20, 1918 |
| 1,430,856 | Slick | Oct. 3, 1922 |
| 1,479,279 | Broido | Jan. 1, 1924 |
| 1,775,331 | Trainer | Sept. 9, 1930 |
| 1,817,854 | Sorensen | Aug. 4, 1931 |
| 1,897,320 | McKnight | Feb. 14, 1933 |
| 1,938,692 | Frank | Dec. 12, 1933 |
| 2,027,285 | Parker | Jan. 7, 1936 |
| 2,089,784 | Cornell | Aug. 10, 1937 |
| 2,240,319 | Taylor | Apr. 29, 1941 |
| 2,319,546 | Insley | May 18, 1943 |

FOREIGN PATENTS

| Number | Country | Date |
|---|---|---|
| 171,780 | Germany | May 15, 1904 |
| 339,903 | Germany | Aug. 18, 1921 |
| 439,258 | Germany | Jan. 7, 1927 |
| 521,450 | Germany | Mar. 25, 1931 |
| 579,190 | France | Oct. 11, 1924 |
| 767,266 | France | July 13, 1934 |